(12) United States Patent
Grohmann

(10) Patent No.: US 10,579,948 B2
(45) Date of Patent: Mar. 3, 2020

(54) METHOD FOR MONITORING A USE OF A SURFACE PROCESSING APPARATUS AND INFORMATION SYSTEM

(71) Applicant: Alfred Kärcher GmbH & Co. KG, Winnenden (DE)

(72) Inventor: Alexander Grohmann, Urbach (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 755 days.

(21) Appl. No.: 15/170,458

(22) Filed: Jun. 1, 2016

(65) Prior Publication Data
US 2016/0283891 A1 Sep. 29, 2016

Related U.S. Application Data

(63) Continuation of application No. PCT/EP2013/075274, filed on Dec. 2, 2013.

(51) Int. Cl.
| | |
|---|---|
| *G06Q 10/06* | (2012.01) |
| *H04W 4/50* | (2018.01) |
| *H04L 29/08* | (2006.01) |
| *A47L 11/40* | (2006.01) |

(52) U.S. Cl.
CPC .. *G06Q 10/063114* (2013.01); *A47L 11/4008* (2013.01); *H04L 67/125* (2013.01); *H04W 4/50* (2018.02); *A47L 2201/06* (2013.01)

(58) Field of Classification Search
CPC .......... G06Q 10/00–50/00; H04W 4/50; H04L 67/125

USPC .................................................. 705/7.11–7.42
See application file for complete search history.

(56) References Cited

U.S. PATENT DOCUMENTS

| | | | |
|---|---|---|---|
| 6,459,955 B1 * | 10/2002 | Bartsch ..................... | A47L 9/00 700/245 |
| 7,218,993 B2 | 5/2007 | Yasukawa et al. | |
| 7,443,298 B2 | 10/2008 | Cole et al. | |
| 8,924,042 B2 * | 12/2014 | Kim ..................... | G05D 1/0016 701/2 |

(Continued)

FOREIGN PATENT DOCUMENTS

| | | |
|---|---|---|
| CN | 1510613 | 7/2004 |
| CN | 1877617 | 12/2006 |
| JP | 2000-304556 | 11/2000 |

*Primary Examiner* — Alan S Miller
(74) *Attorney, Agent, or Firm* — Womble Bond Dickinson (US) LLP

(57) ABSTRACT

The invention relates to a method for monitoring a use of a surface processing apparatus to which a processing task is allocated. In accordance with the invention, in order to provide such a method that enables better monitoring of the execution of the processing task, the surface processing apparatus transmits a notification concerning the operation of the surface processing apparatus at an operating time to an external receiving unit, and, at the receiving unit, it is determined whether the operating time lies before or, at the latest, at a specified or specifiable latest possible operation initiation time, wherein the duration from the operation initiation time to a specifiable or specified latest possible task completion time is at least as long as the expected time for execution of the processing task. The invention further relates to an information system for carrying out the method.

40 Claims, 2 Drawing Sheets

(56) References Cited

U.S. PATENT DOCUMENTS

| | | | |
|---|---|---|---|
| 2005/0204505 A1* | 9/2005 | Kashiwagi | G05D 1/0246 15/319 |
| 2007/0143013 A1* | 6/2007 | Breen | G01S 5/0027 701/32.3 |
| 2011/0202175 A1* | 8/2011 | Romanov | A47L 11/4011 700/250 |
| 2012/0158915 A1* | 6/2012 | Ham | A47L 9/2857 709/219 |
| 2012/0265370 A1* | 10/2012 | Kim | G05D 1/0016 701/2 |
| 2013/0099977 A1* | 4/2013 | Sheshadri | H04W 4/022 342/450 |
| 2013/0218344 A1 | 8/2013 | Teng et al. | |
| 2014/0116469 A1* | 5/2014 | Kim | A47L 9/2894 134/18 |
| 2014/0152835 A1* | 6/2014 | Chen | H04N 7/185 348/158 |
| 2016/0167234 A1* | 6/2016 | Angle | H04L 67/125 701/2 |

* cited by examiner ated by said
METHOD FOR MONITORING A USE OF A SURFACE PROCESSING APPARATUS AND INFORMATION SYSTEM

CROSS-REFERENCE TO RELATED APPLICATIONS

This application is a continuation patent application of international application number PCT/EP2013/075274, filed on Dec. 2, 2013, which is incorporated herein by reference in its entirety and for all purposes.

FIELD OF THE INVENTION

The present invention relates to a method for monitoring a use of a surface processing apparatus to which a processing task is allocated.

The present invention further relates to an information system for carrying out the method.

BACKGROUND OF THE INVENTION

In the related art, methods and information systems are known, with which the use of a surface processing apparatus can be monitored. By way of example, following operation of the surface processing apparatus, in particular the execution of a processing task, an overview of operating and working times of the device can be presented to an operator or supervisor. A corresponding report for example summarizes the working time per surface processing apparatus per unit of time (for example per day) in graph form. The data necessary to establish the report can be transmitted from the surface processing apparatus, with use of a telematics system, to an external receiver, and can be analyzed by said receiver.

In the case of different surface processing apparatuses, it is known to determine times at which the surface processing apparatus may be operated. These also comprise the specification of an earliest possible time of the initiation of operation and a latest possible time of the end of operation. A method of this type serves to check that the surface processing apparatus is used only within an allowed scope of work.

A "surface processing apparatus" is understood in the present case to mean both a surface processing apparatus guided by an operator (for example a walk-behind apparatus or ride-on apparatus) and a self-propelling and self-steering surface processing apparatus, which enables an autonomous processing of a surface. Accordingly, the processing task can be allocated to an operator of the surface processing apparatus, said operator carrying out the processing task with use of the surface processing apparatus. The processing task can also be allocated only to the self-steering and self-propelling surface processing apparatus executing said processing task autonomously.

An object of the present invention is to provide a method of the type mentioned in the introduction which enables better monitoring of the execution of the processing task.

SUMMARY OF THE INVENTION

In a first aspect of the invention, a method for monitoring a use of a surface processing apparatus to which a processing task is allocated is provided, wherein the surface processing apparatus transmits a notification concerning the operation of the surface processing apparatus at an operating time to an external receiving unit. At the receiving unit, it is determined whether the operating time lies before or, at the latest, at a specified or specifiable latest possible operation initiation time. The duration from the operation initiation time to a specifiable or specified latest possible task completion time is at least as long as the expected time for execution of the processing task.

In a second aspect of the invention, an information system comprises a surface processing apparatus to which a processing task is allocated, and an external receiving unit. A notification concerning the operation of the surface processing apparatus at an operating time can be transmitted from the surface processing apparatus to the receiving unit via a communications interface. At the receiving unit, it can be determined whether the operating time lies before or, at the latest, at a specified or specifiable latest possible operation initiation time. The duration from the operation initiation time to a specifiable or specified latest possible task completion time is at least as long as the expected time for execution of the processing task.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS

Figure 1:
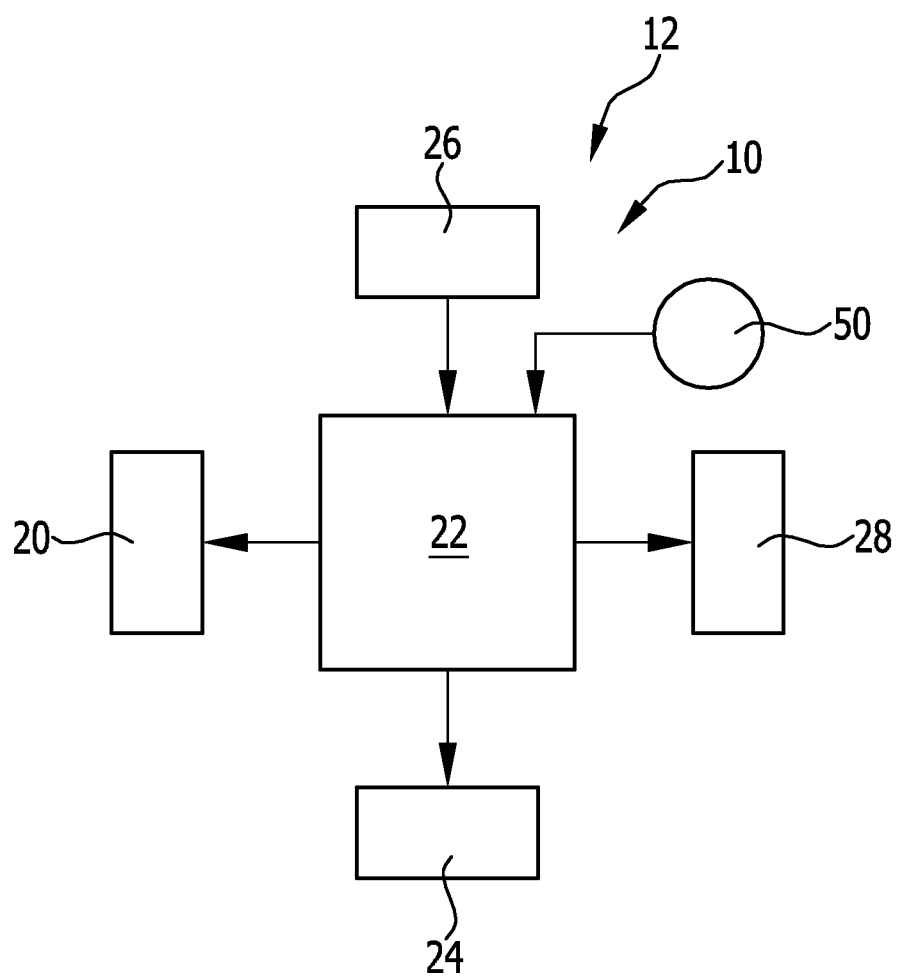
FIG. 1: shows a schematic illustration of a surface processing apparatus in the form of a floor-cleaning apparatus.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a method for monitoring a use of a surface processing apparatus to which a processing task is allocated is provided, wherein the surface processing apparatus transmits a notification concerning the operation of the surface processing apparatus at an operating time to an external receiving unit. At the receiving unit, it is determined whether the operating time lies before or, at the latest, at a specified or specifiable latest possible operation initiation time, wherein the duration from the operation initiation time to a specifiable or specified latest possible task completion time is at least as long as the expected time for execution of the processing task.

With the method in accordance with the invention, provision is made for a notification regarding the operation, and therefore in particular concerning the execution of the processing task, to be transmitted from the surface processing apparatus to an external receiving unit. For example, the external receiving unit is a control center, from which a plurality of surface processing apparatuses can be monitored and/or controlled, for example the control center of an operating company of the surface processing apparatuses. It is determined whether the operation of the surface processing apparatus at the operating time lies before or, at the latest, at a latest possible operation initiation time. It is thus possible to determine, at the receiving unit, that the processing task at the operation initiation time has been executed at least in part or that the execution of the processing task is underway. Under the assumption that the processing task can be executed by the surface processing apparatus in the expected duration, it is thus possible for the receiving unit to determine whether the processing task will have been executed at the latest possible task completion time. This is advantageous in particular when a client of the operator of the surface processing apparatus makes it a condition of the contract that the processing task will have been executed at the latest at the task completion time. For the operator of the surface processing apparatus, a possibility is thus provided already before this moment in time for checking whether the processing task can be executed in time. The processing task can be allocated elsewhere as necessary and preferably, as will be explained in greater detail hereinafter, so that it can be executed in time before the task completion time.

The operation initiation time and/or the task completion time preferably are specifiable, such that the expected time for execution of the task is shorter than the duration between these two times.

In particular, it is favorable if it is determined, at the receiving unit, that the execution of the processing task will be completed before the task completion time, under the assumption that the operation of the surface processing apparatus is continued. At the receiving unit, assurance can thus be provided, for example in an automated manner or by a supervisor of the surface processing apparatus, that the processing task will be executed in time.

The notification is advantageously transmitted from the surface processing apparatus to the receiving unit without any prior request by said receiving unit for notification, and in particular the notification is favorably transmitted from the surface processing apparatus in an automated manner without the assistance of an operator of the surface processing apparatus. It is thus possible to avoid a situation in which an operator forgets to transmit the notification to the receiving unit, although said operator has already started to execute the processing task before the operation initiation time. In addition, the risk of the operator transmitting a corresponding (erroneous) notification to the receiving unit without having executed the processing task is also prevented. Instead, the surface processing apparatus can transmit, by itself, a corresponding notification to the receiving unit, preferably without any prior request by the receiving unit.

It is advantageous if the notification is transmitted from the surface processing apparatus at the operating time. At the operating time, the surface processing apparatus is executing the processing task or starts to do so, such that an unambiguous allocation of the operating time to the work of the surface processing apparatus is possible.

The notification is advantageously transmitted to the receiving unit when the surface processing apparatus is started up or put into service. In the present case, the term "start up" relates in particular to the starting up of the surface processing apparatus by an operator. In the present case, the term "put into service" relates in particular to the commencement of the operation in the case of a self-propelling and self-steering surface processing apparatus.

It is favorable if the notification comprises and/or requires at least one of the following pieces of information:

The surface processing apparatus is switched on. By way of example, a switched-on state is detected in the event of activation of a main switch or of a time switch of the surface processing apparatus.

The notification requires and/or comprises a piece of time information concerning the switch-on time. The time information is, for example, a timestamp for the time of start-up or the time of putting into service of the surface processing apparatus.

At least one functional unit of the surface processing apparatus is in operation or is put into operation. By way of example, the at least one functional unit is a cleaning tool, a drive device, a cleaning agent metering device, a dirt collection device, a pressure generation device, or a heating device of the surface processing apparatus. A piece of time information concerning the start-up of the at least one functional unit can be comprised by the notification and/or required thereby, for example in the form of a timestamp.

The surface processing apparatus is moving. For this purpose, provision can be made for a change in position of the surface processing apparatus to be recorded by means of a position sensor and/or for the operation of a drive device to be monitored and/or for odometrical data of an undercarriage of the surface processing apparatus to be analyzed and monitored. In this case as well, the presence of a piece of time information, for example a timestamp, can be comprised and/or required by the notification.

Provision is favorably made, in addition to the time of start-up or putting into service, for one of the above-mentioned, further pieces of information to be comprised by the notification or necessary for the transmission thereof. By way of example, it is thus possible to ensure that the surface processing apparatus is not only switched on by an operator, but is also used by said operator to execute the processing task, wherein a functional unit is put into operation and the surface processing apparatus is moving, for example.

It is favorable if, at the receiving unit, it is determined whether the operating time lies within a lead time period which is prior to the operation initiation time and of which the duration is specified or specifiable. At the receiving unit, the assurance that the processing task will be executed in time before the task completion time can thus be increased. In particular, the notification, as operating time, can comprise the time of start-up or putting into service of the surface processing apparatus. Provided this lies within the lead time period, it can be assumed at the receiving unit that the processing task can be completed in all likelihood.

Provision can be made for the notification concerning the operation of the surface processing apparatus to be considered as such only when the operating time lies within the lead time period. For example, a notification regarding an operating time before the lead time period can be ignored or discarded. Provided, in this case, there is no further existing notification concerning the operation of the surface processing apparatus, at the latest at the operation initiation time, it can be assumed at the receiving unit that the processing task might not be completed in time. In the case of the present embodiment, it can be ensured, in particular, that an execution of the processing task "too early", at least in part before the lead time period, is acknowledged as invalid. By way of example, this makes it possible to take into consideration the fact that the state of the processed surface changes again over time, such that a renewed processing is necessary. By taking into consideration a processing of the surface at least in part during the lead time period, it is possible to increase the likelihood that, following execution of the processing task, the surface is present in a processed state not requiring renewed processing before the task completion time.

Provision can be made for more than just one notification concerning the operation of the surface processing apparatus to be transmitted from the surface processing apparatus. By way of example, the surface processing apparatus transmits a notification in this regard to the receiving unit at regular intervals.

It is advantageous, if no notification of the surface processing apparatus concerning the operation thereof has been transmitted to the receiving unit by the operation initiation time (or, as mentioned above, is not considered as such), that at least one of the following is carried out by the receiving unit:

- A message is transmitted to a supervisor of the surface processing apparatus. By way of example, a head of operations, who is supervising the receiving unit and one or more surface processing apparatuses, is informed of the risk of a potential uncompleted processing task.
- A report is established, which comprises the lack of, or tardy execution of the processing task by the surface processing apparatus. By way of example for documentation and monitoring purposes, a corresponding report can be established by the receiving unit. By way of example, the reliability of an operator of the surface processing apparatus can be monitored on the basis of the report or a plurality of reports.
- A notification and allocation of the processing task allocated to the surface processing apparatus are transmitted to a further surface processing apparatus or an operator of the further surface processing apparatuses. In order to ensure that the processing task can be executed as early as possible before the task completion time, the receiving unit can allocate this processing task to the surface processing apparatus or operator thereof.

The above-mentioned acts are performed by the receiving unit preferably without the assistance of a user, for example without the assistance of the supervisor.

It is favorable if the surface processing apparatus transmits, to the receiving unit, a further notification concerning the execution of the processing task, in particular when the notification is transmitted from the surface processing apparatus in an automated manner without the assistance of an operator of the surface processing apparatus. When the processing task is completed, a further notification in this regard can be transmitted to the receiving unit. The conclusion of the processing task can thus be detected by the receiving unit, and it can be determined whether this lies before or after the task completion time.

By way of example, the further notification is transmitted when the surface processing apparatus is put out of service. The further notification comprises and/or requires, for example, a piece of time information concerning the time of putting out of service, for example in the form of a timestamp.

As already mentioned, provision is favorably made for it to be determined, at the receiving unit, whether the time of the execution of the processing task lies after the task completion time. It is thus possible to ascertain whether the execution of the processing task has taken longer than expected, even with start-up or putting into service of the surface processing apparatus at the latest at the operation initiation time. By way of example, the expected duration for the execution can be extended on the basis of this information, and a new operation initiation time can be specified accordingly.

It is advantageous if a message that the time of execution lies after the task completion time is issued to a supervisor of the surface processing apparatus and/or if a report is established that comprises an entry regarding the delayed execution of the processing task by the surface processing apparatus. The message and/or the report can prompt the supervisor or the client thereof to correct the expected time for execution and, for example, to set the operation initiation time earlier.

It is favorable when specifications of the latest possible operation initiation time, of the latest possible task completion time, and/or of a lead time period prior to the operation initiation time are provided by a supervisor via an input interface.

The receiving unit can comprise an input interface or can be coupled to an input interface of this type.

The input interface can preferably provide, have, or take the form of an Internet portal, via which the specifications are provided. The supervisor can thus provide corresponding specifications in a user-friendly and simple manner.

The specifications can be provided for an individual (a particular) surface processing apparatus, two or more surface processing apparatuses of the same type or different types, and/or for two or more surface processing apparatuses used in a common specified or specifiable operation area. By way of example, the specifications are provided per surface processing apparatus, per processing group, each processing group for example using two or more surface processing apparatuses of the same type, and/or for an operation area, which for example is a building to be cleaned or a place of business of the operating company of the surface processing apparatus. It is also conceivable for the specifications to be provided for all surface processing apparatuses of the operator.

It is advantageous if a report is established regarding at least one surface processing apparatus, said report comprising at least one of the following:

- A determination that a processing task allocated to the at least one surface processing apparatus has not been executed or has not been executed before the task completion time. This has already been discussed above.
- The reason for this, if this is to be attributed to a technical cause, in particular a defect of the surface processing apparatus. Provision can be made for the surface processing apparatus to transmit a notification to the receiving unit in an automated manner or with the assistance of an operator, said notification informing that there is a defect and in particular the type of defect. A corresponding notification can also be sent by the receiving unit, for example on request. This happens for example when no notification concerning the operation of the surface processing apparatus has been transmitted by the operation initiation time. The aforementioned information in the report allows the operator of the surface processing apparatus to initiate a repair for said surface processing apparatus or to provide a replacement for said surface processing apparatus as soon as possible. Furthermore, the task scheduling can be influenced by allocating a processing task allocated to said surface processing apparatus to another surface processing apparatus.
- Intended working times of the at least one surface processing apparatus, in particular the operation initiation time, the task completion time, and/or a lead time period prior to the operation initiation time, and also processing tasks allocated to the surface processing apparatus. A supervisor can thus see a clear overview of the scheduled uses of the at least one surface processing apparatus.

Actual working times of the at least one surface processing apparatus, in particular day-dependent operating time (for example operating hours per day and period) or a day-dependent operating interval (for example per day and per period).

The report is preferably provided at an output interface, which provides, has, or takes the form of an Internet portal. The output interface is in particular the above-mentioned input interface.

As already mentioned, provision can be made for a self-propelling and self-steering surface processing apparatus to be used as surface processing apparatus.

In particular, the method is applied with a surface-cleaning apparatus, especially with a floor-cleaning apparatus.

By way of example, the surface-cleaning apparatus is a sweeper, a scrubber vacuum, a vacuum cleaner, a sweep-vacuum machine, or a snow plough. The surface-cleaning apparatus can be a walk-behind apparatus or a ride-on device. The surface-cleaning apparatus can be, for example, a blaster, for example a fluid blaster or a particle blaster, for example a high-pressure cleaning apparatus, a dry ice blaster, or a sand blaster.

The at least one functional unit of a surface-cleaning apparatus can be, for example, a drive device, a cleaning agent metering device, a dirt collection device, a pressure generation device, or a heating device.

The present invention further relates to an information system comprising a surface processing apparatus to which a processing task is allocated, and an external receiving unit, wherein a notification concerning the operation of the surface processing apparatus at an operating time can be transmitted from the surface processing apparatus to the receiving unit via a communications interface, wherein at the receiving unit, it can be determined whether the operating time lies before or, at the latest, at a specified or specifiable latest possible operation initiation time, and wherein the duration from the operation initiation time to a specifiable or specified latest possible task completion time is at least as long as the expected time for execution of the processing task.

In particular, the information system allows to carry out one of the above-mentioned methods.

With use of the information system, the advantages already attainable in conjunction with the explanation of the method in accordance with the invention can be attained, and therefore reference is made in this regard to the above explanations.

Notifications are transmitted, preferably wirelessly, from the surface processing apparatus to the receiving unit. The transmission can be implemented with use of all possible technologies, communications networks, and protocols well known to a person skilled in the art. By way of example, notifications are transmitted via a far-reaching telecommunications network.

Advantageous embodiments of the information system in accordance with the invention will be discussed hereinafter. With regard to the advantages of said embodiments, reference can be made to the above explanations of advantageous exemplary embodiments of the method in accordance with the invention.

At the receiving unit, it can preferably be determined that the execution of the processing task will be completed before the task completion time, under the assumption that the operation of the surface processing apparatus is continued.

The notification favorably can be transmitted from the surface processing apparatus to the receiving unit without any prior request by said receiving unit for notification, and in particular the notification can be transmitted from the surface processing apparatus in an automated manner without the assistance of an operator of the surface processing apparatus.

The notification preferably can be transmitted from the surface processing apparatus at the operating time.

It is favorable if the notification can be transmitted to the receiving unit when the surface processing apparatus is started up or put into service.

It is advantageous if the notification comprises and/or requires at least one of the following pieces of information:
  the surface processing apparatus is switched on;
  a piece of time information concerning the switch-on time;
  at least one functional unit of the surface processing apparatus is in operation;
  the surface processing apparatus is moving.

It is favorable if, at the receiving unit, it can be determined whether the operating time lies within a lead time period which is prior to the operation initiation time and of which the duration is specified or specifiable.

Provision can be made for the notification concerning the operation of the surface processing apparatus to be considered as such only when the operating time lies within the lead time period.

It is favorable, if no notification concerning the operation of the surface processing apparatus has been transmitted from said surface processing apparatus to the receiving unit by the operation initiation time, for at least one of the following to be able to be carried out by the receiving unit:
  a message is transmitted to a supervisor of the surface processing apparatus;
  a report is established, which comprises the lack of, or tardy execution of the processing task by the surface processing apparatus;
  a notification and allocation of the processing task allocated to the surface processing apparatus are transmitted to a further surface processing apparatus or an operator of the further surface processing apparatus.

Provision can be made for the above-mentioned acts to be able to be carried out by the receiving unit without the assistance of a user, for example without the assistance of a supervisor.

A further notification concerning the execution of the processing task can be transmitted advantageously from the surface processing apparatus to the receiving unit, and in particular the notification can be transmitted from the surface processing apparatus preferably in an automated manner without the assistance of an operator of the surface processing apparatus.

The further notification favorably can be transmitted when the surface processing apparatus is put out of service.

At the receiving unit, it preferably can be determined whether the time of the execution of the processing task lies after the task completion time.

It is favorable if a message in this regard is issued to a supervisor of the surface processing apparatus and/or if a report can be established, which comprises an entry concerning the delayed execution of the processing task by the surface processing apparatus.

It is advantageous if specifications of the latest possible operation initiation time, of the latest possible task completion time, and/or of a lead time period prior to the operation initiation time can be provided by a supervisor via an input interface.

The input interface preferably has, provides, or takes the form of an Internet portal, via which the specifications can be provided.

The specifications preferably can be provided for an individual surface processing apparatus, two or more surface processing apparatuses of the same type or different types, and/or for two or more surface processing apparatuses used in a common specified or specifiable operation area.

It is advantageous if a report can be established concerning at least one surface processing apparatus, said report comprising at least one of the following:
- a determination that a processing task allocated to the at least one surface processing apparatus has not been executed or has not been executed before the task completion time;
- the reason for this, if this is to be attributed to a technical cause, in particular a defect of the surface processing apparatus;
- intended working times of the at least one surface processing apparatus, in particular the operation initiation time, the task completion time, and/or a lead time period prior to the operation initiation time, and also processing tasks allocated to the surface processing apparatus;
- actual working times of the at least one surface processing apparatus, in particular a day-dependent operating time or a day-dependent operating interval.

The report preferably can be provided at an output interface, which provides, has, or takes the form of an Internet portal.

The surface processing apparatus can be a self-propelling and self-steering surface processing apparatus.

The surface processing apparatus can be a surface-cleaning apparatus, in particular a floor-cleaning apparatus.

FIG. 1 shows, in a schematic illustration, a floor-cleaning apparatus, which is denoted by reference numeral 10 and which is a surface processing apparatus 12 of an advantageous embodiment of an information system in accordance with the invention, indicated by reference numeral 14. The information system 14 allows the monitoring of a use of the floor-cleaning apparatus 10, to which is allocated a processing task to be completed, specifically a cleaning task for cleaning a floor surface (not illustrated in the drawing).

The floor-cleaning apparatus 10 is, by way of example, a vacuum cleaner, a sweeper, a sweep-vacuum machine, or a scrubber vacuum.

The floor-cleaning apparatus 10 can be a walk-behind device or a ride-on device, which is guided by an operator 16.

The information system 14 can comprise further surface processing apparatuses, in particular floor-cleaning apparatuses. By way of example, two further floor-cleaning apparatuses 10' and 10" are provided, which have a construction identical to the floor-cleaning apparatus 10 and which can be operated by operators 16' and 16", respectively.

The information system 14 can additionally comprise further surface processing apparatuses of different types. By way of example, two surface processing apparatuses formed as floor-cleaning apparatuses 18, 18' are shown. The floor-cleaning apparatuses 18, 18' are self-propelling and self-steering, whereby a floor surface can be autonomously cleaned, without the presence of an operator.

The floor-cleaning apparatus 10 comprises at least one functional unit 20, for example a cleaning tool, a pressure generation device, a cleaning agent metering device, a dirt collection device, or a drive device. The functional unit 20 can be controlled by a control unit 22 of the floor-cleaning apparatus 10. The control unit 22 can also control an undercarriage 24 for moving over the floor surface to be processed. A drive device can be integrated in the undercarriage 24.

Figure 2:
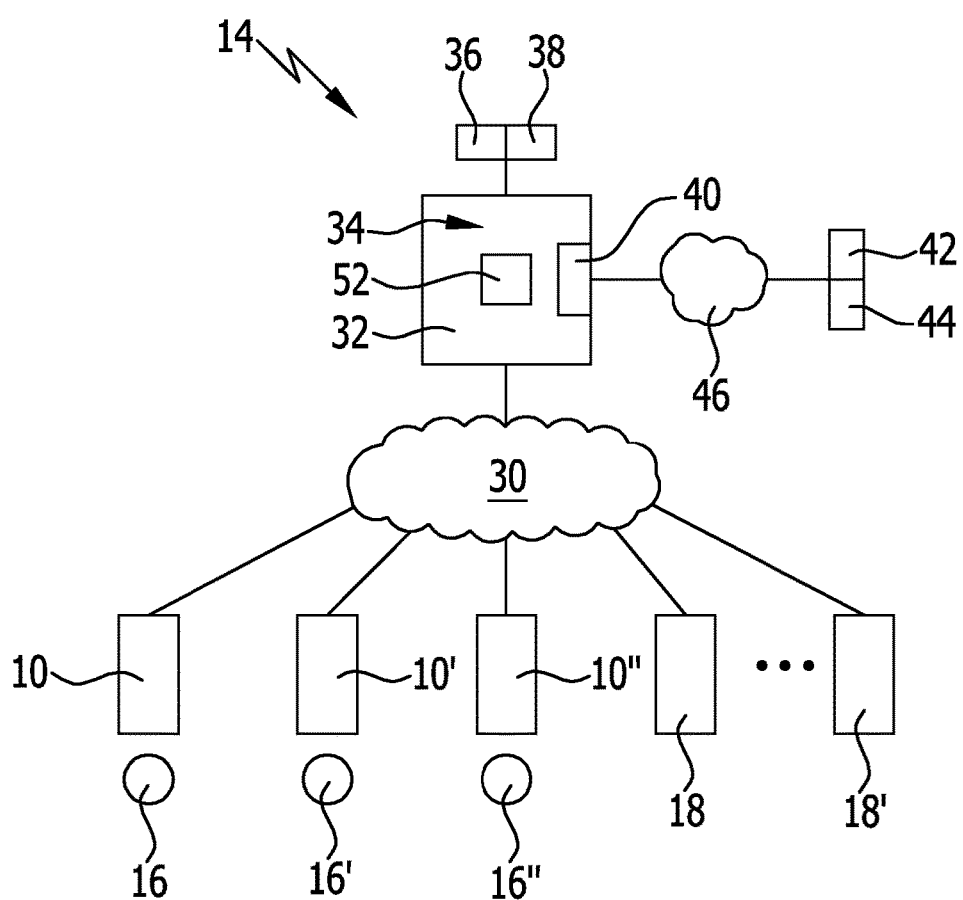
FIG. 2: shows a schematic illustration of an information system in accordance with the invention, comprising the floor-cleaning apparatus from FIG. 1, for carrying out a method in accordance with the invention.

A user can control the floor-cleaning apparatus 10 via an operating unit 26 coupled to the control unit 22. The floor-cleaning apparatus 10 also comprises a communications unit 28, which can be controlled by the control unit 22. Notifications can be transmitted wirelessly from the floor-cleaning apparatus 10 via the communications unit 28. The transmission is implemented by way of example via a communications network 30 illustrated in an exemplary manner by FIG. 2, for example a long-range telecommunications network. Alternatively or in addition, the Internet can be used as a communications network 30. The further floor-cleaning apparatuses 10', 10", 18, 18', . . . of the information system 14 can also transmit notifications wirelessly via a communications network 30 or a plurality of communications networks.

The information system 14 comprises an external receiving unit 32, which is physically separate from the floor-cleaning apparatus 10, is likewise coupled to the communications network 30, and by means of which notifications can be received. The receiving unit 32 is, by way of example, formed or comprised by an external data processing apparatus 34, in particular in the form of a computer or server. The data processing apparatus 34 is, by way of example, owned by or under the management of an operating company of the information system 14 and therefore the floor-cleaning apparatus 10.

The receiving unit 32 can have an input unit 36 and an output unit 38 for receiving inputs and for providing outputs of the receiving unit 32, respectively. In addition, the receiving unit 32 can comprise an input and/or output interface 40. An input unit 42 arranged physically separate from the receiving unit 32 and/or a physically removed output unit 44 can be coupled to the receiving unit 32 via the input and/or output interface 40. The coupling is implemented in the present case via a communications network 46. By way of example, the communications network 46 is the Internet or a telecommunications network.

As already mentioned, a cleaning task is allocated to the floor-cleaning apparatus 10. In the present case, this is to be understood in particular to mean that the operator 16 receives an order to clean a floor surface using the floor-cleaning apparatus 10. The operator 16 can, for this purpose, put the floor-cleaning apparatus 10 into operation and execute the cleaning task.

Figure 3:
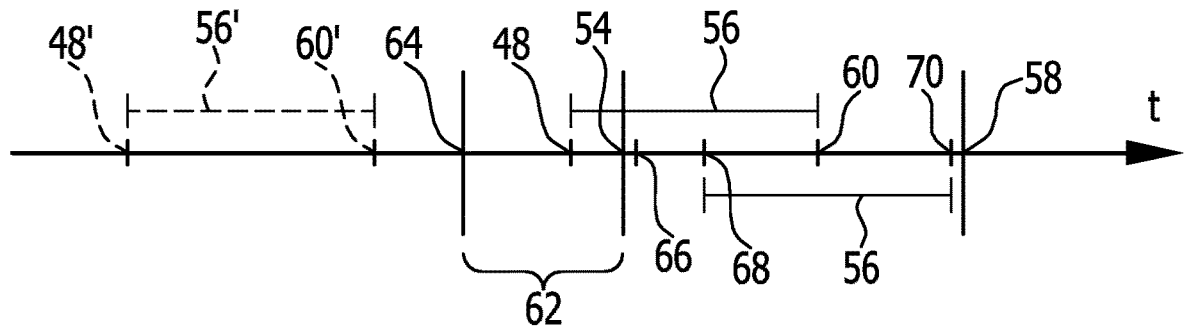
FIG. 3: shows a schematic illustration of a timeline, on the basis of which the execution of a processing task allocated to the floor-cleaning apparatus from FIG. 1 is explained.

The operating principle of the information system 14 and the sequence of a preferred exemplary embodiment of the method in accordance with the invention will be explained hereinafter, in particular with reference to FIG. 3.

In the present case, it is firstly assumed that the operator 16 puts the floor-cleaning apparatus 10 into operation at an operating time 48 for execution of the cleaning task. The floor-cleaning apparatus 10 sends a notification in this regard concerning the operation to the receiving unit 32. Part of the notification is a piece of time information concerning the switch-on time of the floor-cleaning apparatus 10, for example in the form of a timestamp.

The notification is sent at the operating time 48 only when at least one functional unit is in operation, for example a cleaning tool. In addition, the notification is sent only when the floor-cleaning apparatus 10 moves. This can be determined for example on the basis of odometrical data, which the control unit 22 is provided with from the undercarriage 24. In addition or alternatively, the floor-cleaning apparatus 10 can comprise a sensor unit 50 coupled to the control unit 22 or integrated therein, which sensor unit for example can have a position sensor (for example a GPS sensor). The notification transmitted from the floor-cleaning apparatus 10 can comprise a piece of time information, for example a timestamp, concerning the putting into service of the functional unit 20 or the initiation of the movement of the floor-cleaning apparatus 10.

In the present case, the operating time 48 corresponds to the time at which the above-mentioned preconditions are cumulatively met. However, provision can be made for further preconditions or fewer preconditions to be necessary in order to send the notification regarding the operation to the receiving unit 32. By way of example, it is, for this purpose, sufficient for the floor-cleaning apparatus 10 to be switched on.

The notification sent from the floor-cleaning apparatus 10 is analyzed by the receiving unit 32. For this purpose, the receiving unit 32 can have an analysis member 52. The analysis member 52 can be a computing member, for example a microprocessor with software stored thereon or run thereby.

The receiving unit 32 determines whether the operating time 48 lies before or, at the latest, at a latest possible operation initiation time 54. In the present case, the operation initiation time 54 is specified such that, under the assumption of an expected duration 56 for executing the cleaning task, it is ensured that the cleaning task is executed at the latest at a task completion time 58. The period from the operation initiation time 54 to the subsequent task completion time 58 is accordingly at least as long as the expected duration 56 for the execution of the cleaning task. The period is preferably longer than the duration 56, as will be discussed in greater detail hereinafter.

In the present case, the receiving unit 32 determines that the operation initiation time 48 lies before the operation start time 54 and the floor-cleaning apparatus 10 is in operation before this. Accordingly, the receiving unit 32 determines that the cleaning task will be completed before the task completion time 58 if the operation of the floor-cleaning apparatus 10 is continued. In the present example, the cleaning task is completed after the expected cleaning duration 56 at a conclusion time 60 before the task completion time 58.

The receiving unit 32 can also check whether the operating time 48 lies within a lead time period 62, which starts at a start time 64 prior to the operation initiation time 54. If the receiving unit 32 determines that the floor-cleaning apparatus 10 was in operation at least once during the lead time period 62 and accordingly is executing the cleaning task, the receiving unit 32 can determine with greater assurance that, in the absence of exceptional circumstances, the cleaning task will be completed following expiry of the expected duration 56 and will be finished before the task completion time 58.

It is assumed hereinafter that the receiving unit 32 determines, on account of the notification of the floor-cleaning apparatus 10, that this is in operation at an operating time 48' before the lead time period 62 for execution of the cleaning task. In some circumstances, the cleaning task is completed at a conclusion time 60' even before the lead time period 62.

If the operating time 48' lies before the lead time period 62, provision can be made for the receiving unit 32 not to consider the notification concerning the operation of the floor-cleaning apparatus 10 as such. In other words, the receiving unit 32 can assume that there is no notification present concerning the operation before or, at the latest, at the operating initiation time 54. This makes it possible to take into account the fact that, following conclusion of a cleaning task, for example at the conclusion time 60', the state of the cleaned floor surface changes. It can be expected, accordingly, that the state of the floor surface has deteriorated up to the task completion time 58, such that the cleaning task is considered not to have been carried out or to have been carried out only insufficiently. In order to take into consideration a possible change in state following conclusion of the cleaning task, the receiving unit 32 therefore checks whether the operating time 48 lies in the lead time period 62.

It is assumed hereinafter that, at the operating initiation time 54, there exists no notification of the floor-cleaning apparatus 10 concerning the operation and the execution of the cleaning task. The receiving unit 32 can transmit, in an automated manner, a notification to a further surface processing apparatus, with the objective of ensuring an execution of the cleaning task before the task completion time 58. In order to authorize a corresponding set-up time and/or transport time of the further surface processing apparatus, it is therefore favorable if the duration from the operating initiation time 54 to the task completion time 58 is longer than the expected time for execution of the cleaning task.

In the present case, by way of example, a notification of the receiving unit 32 is issued to the operator 16' to carry out the cleaning task of the floor-cleaning apparatus 10 using the floor-cleaning apparatus 10'. The notification is issued in the present case at a notification time 66 shortly after the operation initiation time 54.

The cleaning task is carried out with use of the floor-cleaning apparatus 10'. A corresponding operating time 68 is communicated in an automated manner to the receiving unit 32 from the floor-cleaning apparatus 10'. The cleaning task is carried out in the present case in the expected duration 56 and, at a conclusion time 70, is completed still before the task completion time 58. The conclusion time 70 (and correspondingly the conclusion time 60) are communicated in an automated manner from the floor-cleaning apparatus 10' (and 10) to the receiving unit 32 when said floor-cleaning apparatus is put out of service.

Due to the allocation of the cleaning task not yet executed, from the floor-cleaning apparatus 10 to the floor-cleaning apparatus 10', it is possible to ensure that the cleaning task is executed before the task completion time 58 to the greatest possible extent. A corresponding request can be stipulated by a client to the operator of the information system 14. By way of example, the task completion time 58 corresponds to a time at which a building is opened and at which the presence of surface processing apparatuses in the building is undesirable.

If, at the operating start time 54, the receiving unit 32, as explained above, has not received any notification from the floor-cleaning apparatus 10 concerning the operation, a message is transmitted, in addition or alternatively, to a supervisor of the information system 14. The message is output for example at the output unit 38 or the output unit 44. The supervisor can also reallocate the cleaning task, for example to the operator 16', without this being performed in an automated manner by the receiving unit 32. Provision can also be made for the supervisor merely to be informed of the incident, without any need for the supervisor to be involved in the allocation of the cleaning task.

In addition or alternatively, the receiving unit 32 establishes a report, in which the absence of the execution of the cleaning task by the floor-cleaning apparatus 10 is contained. A corresponding report can be presented or called up at the output units 38 or 44, transmitted to a supervisor or a client for the operator of the information system 14, or viewed thereby.

For example, in this report or a different type of report concerning the information system 14, the receiving unit 32 can communicate the following facts:

The report can contain a determination that a cleaning task and, possibly, which cleaning task has not been executed before the task completion time 58. This can be ascertained solely on account of the determination whether a particular surface processing apparatus is or has been in operation, at the latest, at the operation initiation time 54 and within the lead time period 62. If the non-execution of a cleaning task is to be attributed to a technical cause, for example a defect of a surface processing apparatus, the report can contain the corresponding cause. This makes it possible to initiate a repair or to replace the surface processing apparatus. In order to determine the cause, provision can be made for the receiving unit 32 to make a corresponding request at the surface processing apparatus 12 or for the surface processing apparatus 12 or operator thereof to transmit a corresponding notification to the receiving unit 32.

The report can also comprise intended working times of a particular surface processing apparatus, for example the operation initiation time, the task completion time, and/or the lead time period.

The report can also comprise actual working times of a surface processing apparatus, for example a day-dependent operating time or a day-dependent operating interval.

A supervisor can specify a particular operation initiation time 54, a task completion time 58, and a lead time period 62 via the input units 36 and 42. The specification is provided for example for an individual surface processing apparatus, for two or more surface processing apparatuses of the same type or of a different type, and/or for two or more surface processing apparatuses used in a common specified or specifiable operation area (for example a building). By way of example, the specifications are specified per floor-cleaning apparatus, per group of identical floor-cleaning apparatuses, per building to be cleaned, per place of business of the operator of the information system 14, or for the entire device fleet of said operator.

It is advantageous when the specification via the input unit 42 and the output of a report via the output unit 44 is possible via the Internet. For this purpose, it is favorable when the input and/or output interface 40 provides, comprises, or takes the form of an Internet portal. A corresponding application can be stored in software in the receiving unit 32. The use of an Internet portal has proven to be simple and user-friendly, both for a supervisor and for a client of the operator of the information system 14.

The use of the information system 14 and the execution of the method in accordance with the invention accordingly make it possible to better monitor the use of surface processing apparatuses to which cleaning tasks are allocated. In particular, it is possible to better ensure that a cleaning task has been executed at a task completion time 58 to the greatest possible extent. The requirements of a client can thus be better met. Due to the possibility of reallocating a cleaning task within the information system 14 (in particular in an automated manner by the receiving unit 32), cleaning tasks can be executed in a shorter time and in a client-oriented manner.

In particular, a notification to the receiving unit 32 transmitted in an automated manner from the relevant surface-cleaning apparatus concerning the working on the cleaning task when the surface processing apparatus is put into service has proven to be advantageous. As mentioned, it is possible to determine, in good time, when a cleaning task might not be able to be executed before the task completion time 58, such that countermeasures can be taken as appropriate. The establishment of a corresponding report also serves as an evidencing function for the operator of the information system 14, so that said operator can demonstrate to the client that cleaning tasks have actually been executed.

The invention claimed is:

1. A method for monitoring a use of a surface processing apparatus, comprising:
    allocating a processing task to the surface processing apparatus, an expected time for execution being associated with the processing task;
    transmitting, with a communications unit of the surface processing apparatus, a notification to an external receiving unit indicative of an operation of the surface processing apparatus at an operating time and therefore indicative of the execution of the processing task;
    determining, at the receiving unit, whether the operating time lies before or, at the latest, at a specified or specifiable latest possible operation initiation time,
    wherein the duration from the operation initiation time to a specifiable or specified latest possible task completion time is at least as long as the expected time for execution of the processing task.

2. The method in accordance with claim 1, comprising:
    determining, at the receiving unit, whether the execution of the processing task will have been completed at the latest possible task completion time, under the assumption that the operation of the surface processing apparatus is continued after transmission of the notification.

3. The method in accordance with claim 1, comprising transmitting the notification from the surface processing apparatus to the receiving unit without any prior request by said receiving unit for notification.

4. The method in accordance with claim 1, comprising transmitting the notification from the surface processing apparatus at the operating time.

5. The method in accordance with claim 1, comprising transmitting the notification to the receiving unit when the surface processing apparatus is started up or put into service.

6. The method in accordance with claim 1, wherein the notification comprises or requires at least one of the following pieces of information:
    the surface processing apparatus is switched on;
    a piece of time information concerning the switch-on time;
    at least one functional unit of the surface processing apparatus is in operation;
    the surface processing apparatus is moving.

7. The method in accordance with claim 1, comprising determining, at the receiving unit, whether the operating time lies within a lead time period which is prior to the latest possible operation initiation time and of which the duration is specified or specifiable.

8. The method in accordance with claim 7, comprising considering the notification received by the receiving unit as a notification concerning the operation of the surface processing apparatus only when the operating time lies within the lead time period.

9. The method in accordance with claim 1, wherein, if no notification concerning the operation of the surface processing apparatus has been transmitted from said surface processing apparatus to the receiving unit by the latest possible operation initiation time, at least one of the following is carried out by the receiving unit:
   transmitting a message to a supervisor of the surface processing apparatus;
   establishing a report, which comprises the lack of, or tardy execution of the processing task by the surface processing apparatus;
   transmitting a notification and allocation of the processing task allocated to the surface processing apparatus to a further surface processing apparatus or an operator of the further surface processing apparatus.

10. The method in accordance with claim 1, comprising transmitting from the surface processing apparatus to the receiving unit, a further notification concerning the execution of the processing task when the processing task is completed.

11. The method in accordance with claim 10, comprising transmitting the further notification when the surface processing apparatus is put out of service.

12. The method in accordance with claim 10, comprising transmitting, at the receiving unit, whether the time of the execution of the processing task lies after the latest possible task completion time.

13. The method in accordance with claim 12, comprising issuing a message that the execution of the processing task lies after the latest possible task completion time to a supervisor of the surface processing apparatus, and/or establishing a report, which comprises an entry concerning the delayed execution of the processing task by the surface processing apparatus.

14. The method in accordance with claim 1, comprising providing, by a supervisor via an input device, specifications of at least one of the latest possible operation initiation time, the latest possible task completion time, and a lead time period prior to the operation initiation time.

15. The method in accordance with claim 14, comprising providing the specifications for at least one of an individual surface processing apparatus, two or more surface processing apparatuses of the same type or different types and two or more surface processing apparatuses used in a common specified or specifiable operation area.

16. The method in accordance with claim 14, wherein the input interface provides, has, or takes the form of an Internet portal, via which the specifications are providable.

17. The method in accordance with claim 1, comprising establishing a report concerning at least one surface processing apparatus, said report comprising at least one of the following:
   a determination that a processing task allocated to the at least one surface processing apparatus has not been executed or has not been executed before the latest possible task completion time;
   the reason for failure to execute the processing task or not executing the processing task before the latest possible task completion time, if this is to be attributed to a technical cause, in particular a defect at the surface processing apparatus;
   intended working times of the at least one surface processing apparatus, in particular at least one of the operation initiation time, the latest possible task completion time and a lead time period prior to the latest possible operation initiation time, and also processing tasks allocated to the surface processing apparatus;
   actual working times of the at least one surface processing apparatus, in particular a day-dependent operating time or a day-dependent operating interval.

18. The method in accordance with claim 17, comprising providing the report at an output interface, which provides, has, or takes the form of an Internet portal.

19. The method in accordance with claim 1, wherein a self-propelling and self-steering surface processing apparatus is used as surface processing apparatus.

20. The method in accordance with claim 1, wherein the method is applied with a surface-cleaning apparatus, in particular a floor-cleaning apparatus.

21. An information system comprising:
   a surface processing apparatus to which a processing task is allocated, an expected time for execution being associated with the processing task, the surface processing apparatus comprising at least one functional tool; and
   an external receiving unit,
   wherein a notification indicative of an operation of the surface processing apparatus at an operating time and therefore indicative of the execution of the processing task is transmittable from the surface processing apparatus to the receiving unit via a communications unit of the surface processing apparatus, and
   wherein, at the receiving unit, it is determinable whether the operating time lies before or, at the latest, at a specified or specifiable latest possible operation initiation time, wherein the duration from the operation initiation time to a specifiable or specified latest possible task completion time is at least as long as the expected time for execution of the processing task.

22. The information system in accordance with claim 21, wherein, at the receiving unit, it is determinable whether the execution of the processing task will have been completed before the latest possible task completion time, under the assumption that the operation of the surface processing apparatus is continued after transmission of the notification.

23. The information system in accordance with claim 21, wherein the notification is transmittable from the surface processing apparatus to the receiving unit without any prior request by said receiving unit for notification, in particular wherein the notification is transmittable from the surface processing apparatus in an automated manner without the assistance of an operator of the surface processing apparatus.

24. The information system in accordance with claim 21, wherein the notification is transmittable from the surface processing apparatus at the operating time.

25. The information system in accordance with claim 21, wherein the notification is transmittable to the receiving unit when the surface processing apparatus is started up or put into service.

26. The information system in accordance with claim 21, wherein the notification comprises or requires at least one of the following pieces of information:
   the surface processing apparatus is switched on;
   a piece of time information concerning the switch-on time;
   at least one functional unit of the surface processing apparatus is in operation;
   the surface processing apparatus is moving.

27. The information system in accordance with claim 21, wherein, at the receiving unit, it is determinable whether the operating time lies within a lead time period which is prior to the latest possible operation initiation time and of which the duration is specified or specifiable.

28. The information system in accordance with claim 27, wherein the notification received by the receiving unit is considered as a notification concerning the operation of the surface processing apparatus only when the operating time lies within the lead time period.

29. The information system in accordance with claim 21, wherein, if no notification concerning the operation of the surface processing apparatus has been transmitted from said surface processing apparatus to the receiving unit by the latest possible operation initiation time, at least one of the following is carried out by the receiving unit:
- a message is transmitted to a supervisor of the surface processing apparatus;
- a report is establishable, which comprises the lack of, or tardy execution of the processing task by the surface processing apparatus;
- a notification and allocation of the processing task allocated to the surface processing apparatus are transmitted to a further surface processing apparatus or an operator of the further surface processing apparatus.

30. The information system in accordance with claim 21, wherein a further notification concerning the execution of the processing task is transmittable from the surface processing apparatus to the receiving unit when the processing task is completed, in particular wherein the notification is transmittable from the surface processing apparatus in an automated manner without the assistance of an operator of the surface processing apparatus.

31. The information system in accordance with claim 30, wherein the further notification is transmittable when the surface processing apparatus is put out of service.

32. The information system in accordance with claim 30, wherein, at the receiving unit, it is determinable whether the time of the execution of the processing task lies after the latest possible task completion time.

33. The information system in accordance with claim 32, wherein a message that the execution of the processing task lies after the latest possible task completion time is issued to a supervisor of the surface processing apparatus, and/or wherein a report is establishable, which comprises an entry concerning the delayed execution of the processing task by the surface processing apparatus.

34. The information system in accordance with claim 21, further comprising an input interface, wherein specifications of at least one of the latest possible operation initiation time, the latest possible task completion time and a lead time period prior to the operation initiation time is providable by a supervisor via the input interface.

35. The information system in accordance with claim 34, wherein the specifications are providable for at least one of an individual surface processing apparatus, two or more surface processing apparatuses of the same type or different types and two or more surface processing apparatuses used in a common specified or specifiable operation area.

36. The information system in accordance with claim 34, wherein the input interface provides, has, or taken the form of an Internet portal, via which the specifications are providable.

37. The information system in accordance with claim 21, wherein a report is establishable regarding at least one surface processing apparatus, said report comprising at least one of the following:
- a determination that a processing task allocated to the at least one surface processing apparatus has not been executed or has not been executed before the task completion time;
- the reason for failure to execute the processing task or not executing the processing task before the latest possible task completion time, if this is to be attributed to a technical cause, in particular a defect of the surface processing apparatus;
- intended working times of the at least one surface processing apparatus, in particular at least one of the operation initiation time, the latest possible task completion time and a lead time period prior to the latest possible operation initiation time, and also processing tasks allocated to the surface processing apparatus;
- actual working times of the at least one surface processing apparatus, in particular a day-dependent operating time or a day-dependent operating interval.

38. The information system in accordance with claim 37, wherein the report is providable at an output interface, which provides, has, or takes the form of an Internet portal.

39. The information system in accordance with claim 21, wherein a self-propelling and self-steering surface processing apparatus is used as surface processing apparatus.

40. The information system in accordance with claim 21, wherein the surface processing apparatus is a surface-cleaning apparatus, in particular a floor-cleaning apparatus.

* * * * *